(12) United States Patent
Suzuki et al.

(10) Patent No.: US 8,733,794 B2
(45) Date of Patent: May 27, 2014

(54) SEAT BELT SYSTEM (71) Applicant: Kabushiki Kaisha Tokai Rika Denki Seisakusho, Aichi (JP)

(72) Inventors: Toru Suzuki, Aichi (JP); Yuki Ando, Aichi (JP); Takaya Tsukigase, Nagoya (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 0 days.

(21) Appl. No.: 13/850,031

(22) Filed: Mar. 25, 2013

(65) Prior Publication Data

US 2013/0257030 A1  Oct. 3, 2013

(30) Foreign Application Priority Data

Mar. 27, 2012 (JP) ................................. 2012-071548

(51) Int. Cl.
*B60R 22/00* (2006.01)
(52) U.S. Cl.
USPC .......... 280/801.1; 280/808; 297/468; 297/483
(58) Field of Classification Search
USPC ........ 280/801.1, 802, 803, 808; 297/468, 483
See application file for complete search history.

(56) References Cited

U.S. PATENT DOCUMENTS 6,334,628 B1 * 1/2002 Newball et al. ............ 280/801.1
7,832,770 B2 * 11/2010 Bradley et al. ................ 280/808

FOREIGN PATENT DOCUMENTS

JP  2010-047064 A  3/2010

* cited by examiner

*Primary Examiner* — Faye M. Fleming
(74) *Attorney, Agent, or Firm* — Roberts Mlotkowski Safran & Cole P.C.

(57) ABSTRACT

A seat belt system includes a storage case including a main body having a box shape and a storage portion, the main body having an opening formed thereon through which first and second tongues are inserted, the first tongue being attached to an end of a belt and to be connected to a first buckle on a seat side, the second tongue being movably attached to the belt and to be connected to a second buckle on the seat side, and a storage portion formed in a shape tapered in an insertion direction of the first and second tongues, protruding from the main body and including first and second inclined surfaces that are formed on both sides of a surface opposite a surface having the opening formed thereon and are inclined to guide insertion of the first and second tongues.

9 Claims, 7 Drawing Sheets

FIG.2A

92 FIRST BUCKLE  91 CENTER SEAT  93 SECOND BUCKLE

SEAT BELT SYSTEM

The present application is based on Japanese patent application No. 2012-071548 filed on Mar. 27, 2012, the entire contents of which are incorporated herein by reference.

BACKGROUND OF THE INVENTION

1. Field of the Invention

An embodiment of the invention relates to a seat belt system.

2. Related Art

As a conventional technique, a vehicle seat belt system is known which is provided with a seat belt to be wound onto a retractor installed on a ceiling portion of a vehicle, a fixing tongue attached to an front end of the seat belt and to be connected to one of buckles arranged on the right and left of a seat, a restraining tongue to be connected to another buckle of the seat and a tongue holder for storing the fixing and restraining tongues (see, e.g., JP-A-2010-47064).

This vehicle seat belt system is installed so that, in a state in which the fixing and restraining tongues are stored in the tongue holder, the fixing tongue is in contact with a wall surface inside the tongue holder on the ceiling portion side and a metal fitting portion of the restraining tongue to be connected to the buckle underlies the fixing tongue.

In addition, in the vehicle seat belt system, a force toward the fixing tongue acts on the metal fitting portion using a contact portion between the restraining tongue and the opening of the tongue holder as a fulcrum when a winding force of the retractor acts on the restraining tongue and it is thus possible to hold the fixing tongue in a state of being sandwiched between the metal fitting portion and the wall surface on the ceiling portion side.

SUMMARY OF THE INVENTION

In the conventional vehicle seat belt system, the fixing and restraining tongues may be stored at the storage positions out of alignment.

Accordingly, it is an object of the invention to provide a seat belt system that prevents a noise caused by the misalignment in the storage position and a vibration of a vehicle.

(1) According to one embodiment of the invention, a seat belt system comprises:

a storage case comprising a main body having a box shape and a storage portion, the main body having an opening formed thereon through which first and second tongues are inserted, the first tongue being attached to an end of a belt and to be connected to a first buckle on a seat side, the second tongue being movably attached to the belt and to be connected to a second buckle on the seat side, and a storage portion formed in a shape tapered in an insertion direction of the first and second tongues, protruding from the main body and comprising first and second inclined surfaces that are formed on both sides of a surface opposite a surface having the opening formed thereon and are inclined to guide insertion of the first and second tongues.

In the above embodiment (1) of the invention, the following modifications and changes can be made.

(i) A space between the first and second inclined surfaces at a front end portion of a tongue plate of the second tongue when stored in the storage portion is smaller than a width of the front end portion of the tongue plate of the second plate.

(ii) A tongue plate of the second tongue stored in the storage portion is held by a portion of the belt inserted through and folded back at a first belt insertion hole of the first tongue and by the first and second inclined surfaces.

(iii) The storage portion comprises a corner portion to contact with a front end portion of the tongue plate of the second tongue, and wherein the tongue plate of the second tongue when stored in the storage portion is held at the corner portion by being pressed against the first and second inclined surfaces by an elastic force of the portion of the belt.

(iv) The storage portion comprises, on an inside thereof, a first corner portion to contact with a front end portion of a tongue plate of the first tongue and a second corner portion to contact with a front end portion of a tongue plate of the second tongue.

(v) The first and second corner portions are each formed between the first and second inclined surfaces.

(vi) The first corner portion has a longer distance from the opening than the second corner portion.

Effects of the Invention

According to one embodiment of the invention, a seat belt system can be provided that prevents a noise caused by the misalignment in the storage position and a vibration of a vehicle.

BRIEF DESCRIPTION OF THE DRAWINGS

Next, the present invention will be explained in more detail in conjunction with appended drawings, wherein.

DESCRIPTION OF THE PREFERRED EMBODIMENTS

Summary of the Embodiment

The seat belt system in the embodiment is provided with a storage case composed of a main body having box shape and a storage portion, the main body having an opening formed thereon through which first and second tongues are inserted, the first tongue being attached to an end of a belt and to be connected to a first buckle on a seat side, the second tongue being movably attached to the belt and to be connected to a second buckle on the seat side, and the storage portion being formed in a shape tapered in an insertion direction of the first and second tongues so as to protrude from the main body and having first and second inclined surfaces which are formed on both sides of a surface facing the surface having the opening formed thereon and are inclined to guide insertion of the first and second tongues.

Embodiment

Structure of Seat Belt System 1

Figure 1A:
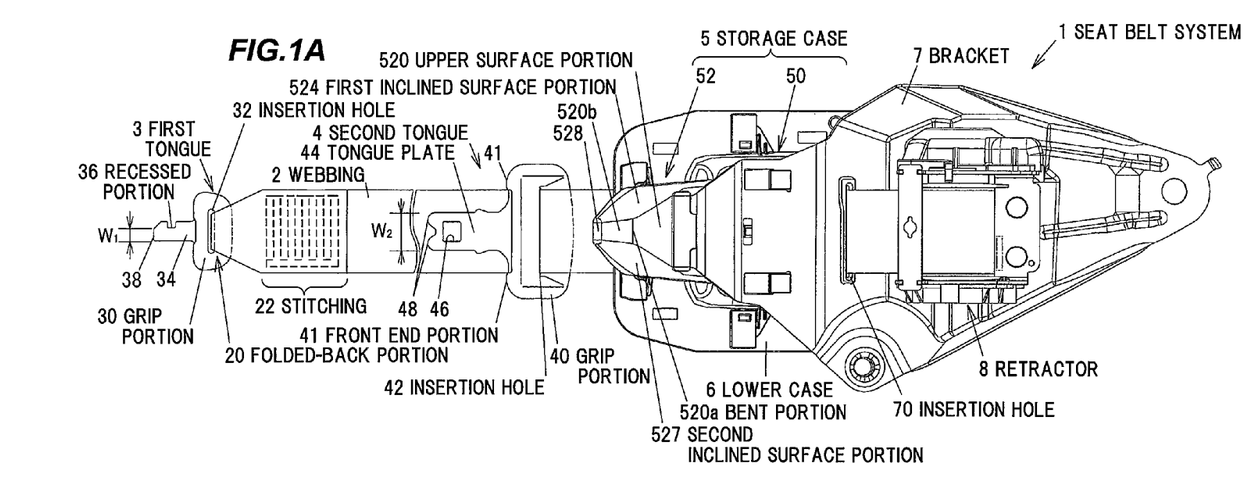
FIG. 1A is a top view showing a seat belt system in an embodiment and FIG. 1B is a side view showing the seat belt system.
Figure 1B:
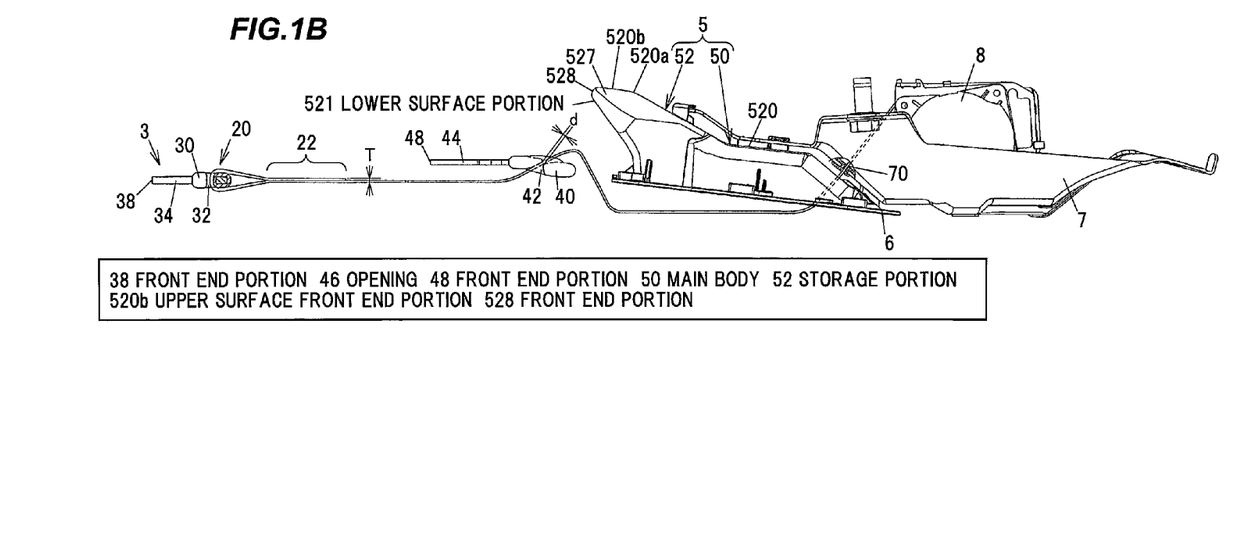
Figure 2A:
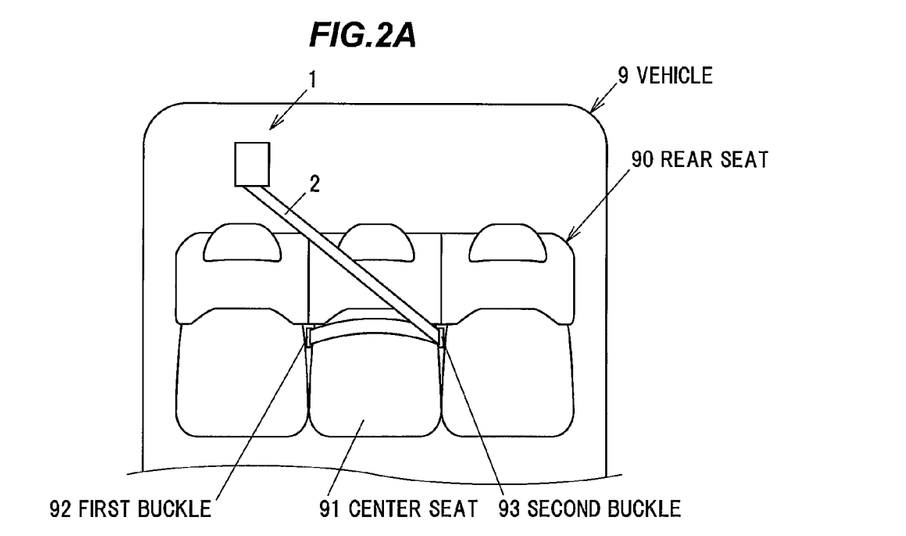
FIG. 2A is a schematic view showing an interior of a vehicle in which the seat belt system in the embodiment is installed and FIG. 2B is a schematic view showing a state in which an occupant is restrained by the seat belt system.
Figure 2B:
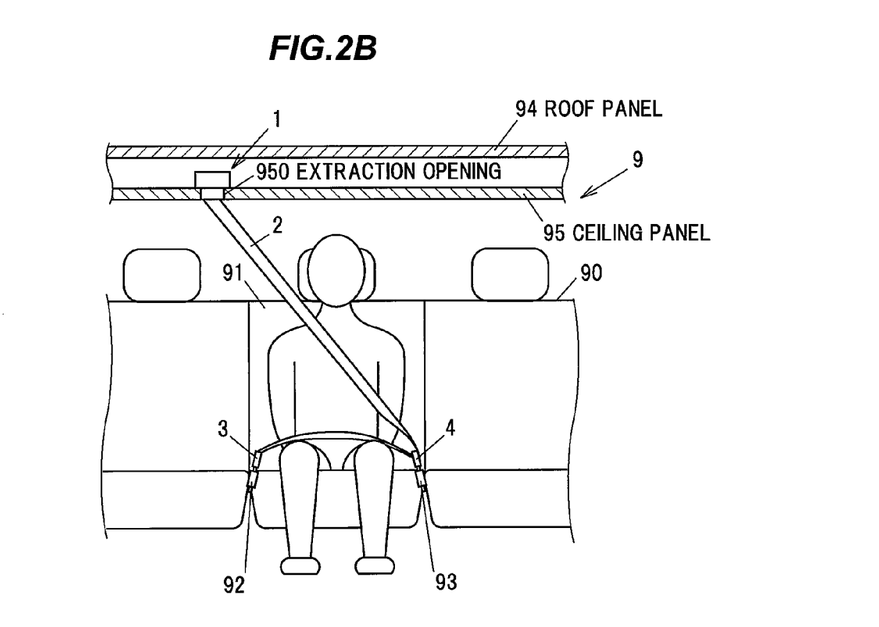

FIG. 1A is a top view showing the seat belt system in the embodiment and FIG. 1B is a side view showing the seat belt system. FIG. 2A is a schematic view showing an interior of a vehicle in which the seat belt system in the embodiment is installed and FIG. 2B is a schematic view showing a state in which an occupant is restrained by the seat belt system. It should be noted that a proportion of part to part in each drawing of the embodiment may be different from an actual proportion.

As shown in FIGS. 1A and 1B, a seat belt system 1 has a first tongue 3 and a second tongue 4. In addition, the seat belt system 1 is configured to store the first tongue 3 and the second tongue 4.

The seat belt system 1 is installed, e.g., behind a rear seat 90 of a vehicle 9 between a roof panel 94 and a ceiling panel 95, as shown in FIGS. 2A and 2B. The seat belt system 1 is, e.g., a seat belt system for a center seat 91 which is a seat located in the middle of the rear seat 90. An extraction opening 950 is formed on the ceiling panel 95. The extraction opening 950 is connected to a below-described insertion opening (an insertion opening 66) of the seat belt system 1, and a webbing 2 and the second tongue 4 are exposed therefrom.

The seat belt system 1 is generally configured to mainly include a storage case 5 having a main body 50 in a box shape and a storage portion 52. On the main body 50, a below-described opening (an opening 506) is formed so that the first tongue 3 attached to an end of the webbing 2 as a belt and to be connected to a first buckle 92 on a side of the center seat 91 as a seat and the second tongue 4 movably attached to the webbing 2 and to be connected to a second buckle 93 on the center seat 91 side are inserted therethrough. The storage portion 52 is formed in a shape tapered in a below-described insertion direction (an arrow-A direction) of the first tongue 3 and the second tongue 4 so as to protrude from the main body 50 and has a below-described first inclined surface (a first inclined surface 534) and a second inclined surface (a second inclined surface 535) which are formed on both sides of a surface (a reverse surface 531) facing a surface (a lower surface 539) having the below-described opening formed thereon and are inclined to guide insertion of the first tongue 3 and the second tongue 4.

In addition, the seat belt system 1 is generally configured to include a lower case 6 and a bracket 7 which are attached to the storage case 5, and a retractor 8 attached to the bracket 7, as shown in FIGS. 1A and 1B.

Structure of Webbing 2

As one example, the webbing 2 is formed in a strap shape using a synthetic resin such as polyester. The webbing 2 pulled from the retractor 8 is subjected to, e.g., a force from the retractor 8 in a winding direction. In addition, the webbing 2 is inserted into an insertion hole 70 of the bracket 7 as well as an insertion hole 504a of the storage case 5 and is pulled out through the insertion opening. The first tongue 3 and the second tongue 4 are attached to the webbing 2 on the storage case 5 side.

The webbing 2 stored in the retractor 8 has a stitching 22. The webbing 2 which passes through and is folded back at an insertion hole 32 as a first belt insertion hole formed on a grip portion 30 as a first grip portion of the first tongue 3 is integrated to form the stitching 22. The stitching 22 is thicker than a width, in a thickness direction, of an insertion hole 42 as a second belt insertion hole of a grip portion 40 as a second grip portion of the second tongue 4 and serves as a movement restricting portion for restricting the movement of the second tongue 4 to the first tongue 3 side.

Structures of First Tongue 3 and Second Tongue 4

As shown in FIG. 2A, the first tongue 3 is connected to the first buckle 92 which is located on the right side of an occupant sitting on the center seat 91.

As shown in FIG. 1A, the first tongue 3 is generally configured to include the grip portion 30 and a tongue plate 34.

The grip portion 30 is formed in, e.g., a plate shape which is long in a direction intersecting with a longitudinal direction of the tongue plate 34. The grip portion 30 is integrated with the tongue plate 34 by insert molding. The grip portion 30 is formed of, e.g., a synthetic resin material such as polyamide.

In addition, the grip portion 30 has the insertion hole 32 through which the webbing 2 is inserted. The webbing 2 inserted into the insertion hole 32 is folded back as shown in FIGS. 1A and 1B and the folded-back overlap portion is then stitched. A thickness T of the stitching 22 as the stitched portion is, e.g., approximately twice the thickness of the webbing 2, as shown in FIG. 1B.

The tongue plate 34 is formed in, e.g., an elongated plate shape. In addition, the tongue plate 34 is formed of, e.g., an alloy material such as carbon steel.

A recessed portion 36 is formed on a side surface of the tongue plate 34. A protrusion provided in the first buckle 92 is engaged with the recessed portion 36 and the first tongue 3 is thereby connected to the first buckle 92.

The second tongue 4 is connected to, e.g., the second buckle 93 located on the left side as seen by an occupant sitting on the center seat 91.

The second tongue 4 is generally configured to include, e.g., the grip portion 40 and a tongue plate 44, as shown in FIG. 1A.

The second tongue 4 is formed in, e.g., a plate shape which is long in a direction intersecting with a longitudinal direction of the tongue plate 44. The grip portion 40 is integrated with the tongue plate 44 by insert molding. The grip portion 40 is formed of, e.g., a synthetic resin material such as polyamide.

In addition, the grip portion 40 has the insertion hole 42 through which the webbing 2 is inserted. For example, a width of the insertion hole 42 in a thickness direction is narrower than the thickness T of the webbing 2, as shown in FIG. 1B. Therefore, the second tongue 4 is configured so as not to be able to move to the first tongue 3 side beyond the stitching 22. In other words, the stitching 22 restricts the movement of the second tongue 4.

The tongue plate 44 is formed in, e.g., an elongated plate shape. In addition, a front end portion 48 of the tongue plate 44 has, e.g., a shape having a recess in the middle, in other words, a shape with a split front end, as shown in FIG. 1A. The tongue plate 44 is formed of, e.g., an alloy material such as carbon steel.

An opening 46 is formed on the tongue plate 44. A protrusion provided in the second buckle 93 enters the opening 46 and the second tongue 4 is thereby connected to the second buckle 93.

The first tongue 3 and the second tongue 4 are attached to the webbing 2 which is pulled out of the retractor 8 and is inserted into the insertion hole 70 of the bracket 7 and the insertion hole 504a of the storage case 5. For example, as shown in FIG. 1B, the first tongue 3 and the second tongue 4 are configured to be pulled to the outside of the storage case 5.

Structure of Storage Case 5

Figures 3A, 3B:
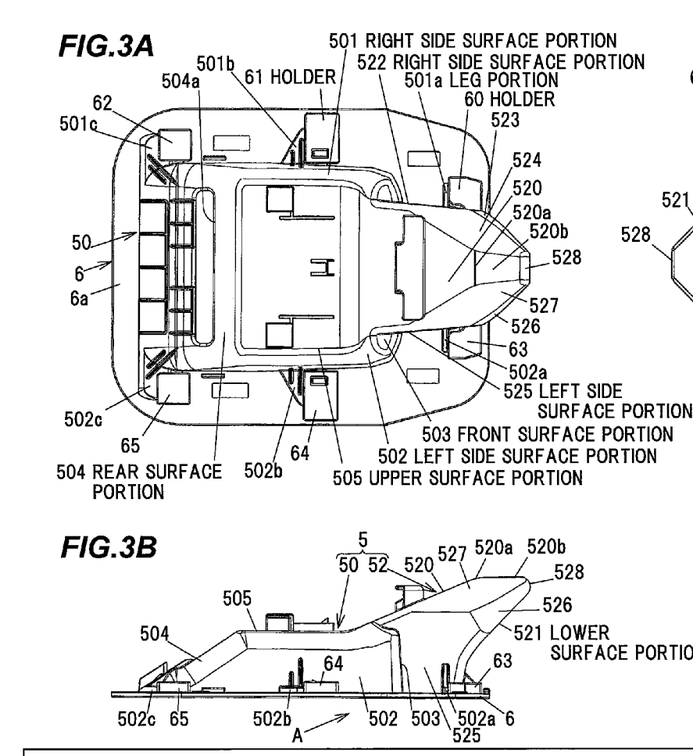
FIG. 3A is a top view showing a storage case with a lower case attached thereto in the embodiment.
FIG. 3B is a left side view.
Figure 3C:
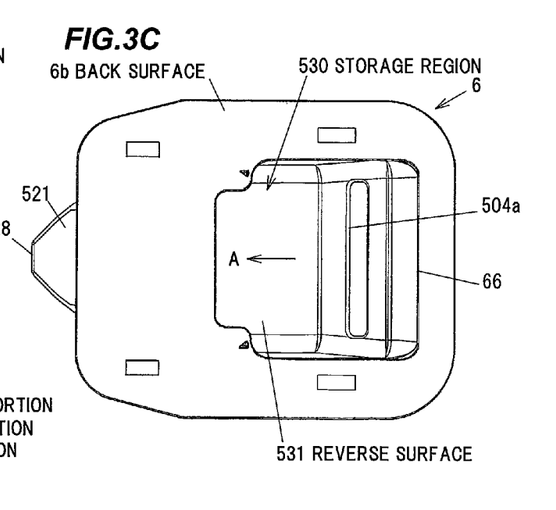
FIG. 3C is a bottom view and FIG. 3D is a front view.
Figure 3D:
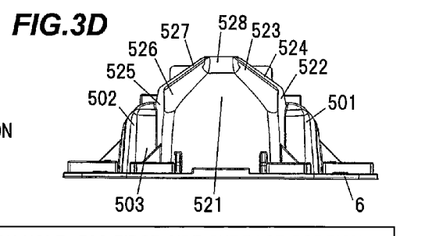
Figure 4A:
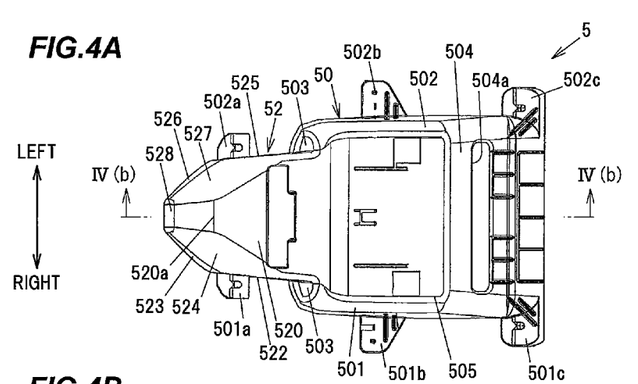
FIG. 4A is a top view showing the storage case in the embodiment.
Figure 4B:
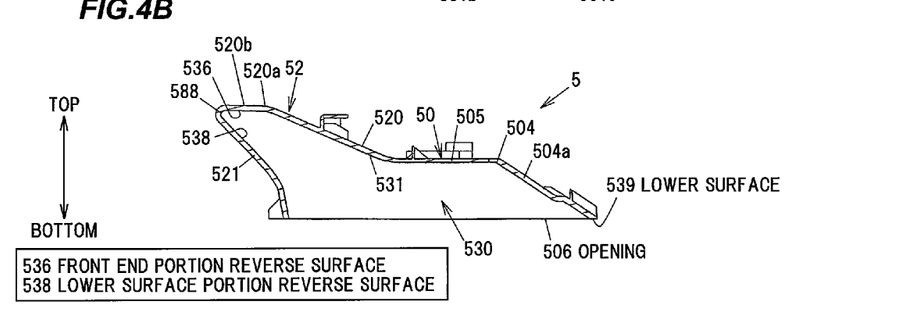
FIG. 4B is a cross sectional view taken on line IV(b)-IV(b) shown in FIG. 4A as viewed in an arrow direction and FIG. 4C is a bottom view showing the storage case.
Figure 4C:
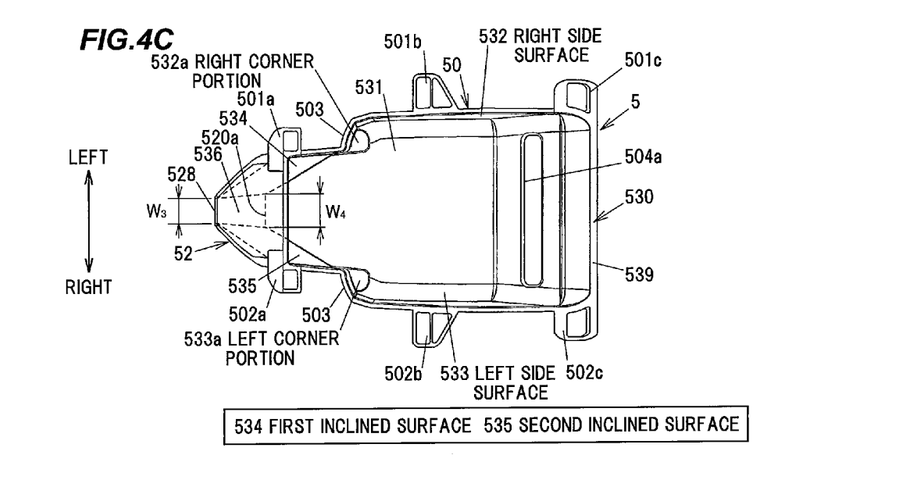

FIG. 3A is a top view showing a storage case with a lower case attached thereto in the embodiment, FIG. 3B is a left side view, FIG. 3C is a bottom view and FIG. 3D is a front view. FIG. 4A is a top view showing the storage case in the embodiment, FIG. 4B is a cross sectional view taken on line IV(b)-IV(b) shown in FIG. 4A as viewed in an arrow direction and FIG. 4C is a bottom view showing the storage case. It should be noted that right, left, top and bottom described herein are based on the definition that the storage portion 52 shown in FIG. 3D is a front side, unless stated otherwise.

The storage case 5 is formed by, e.g., injection molding using a synthetic resin material of polypropylene base, polystyrene base, polyethylene base, polyamide base or acrylonitrile butadiene styrene (ABS), etc. In the present embodiment, the storage case 5 is formed of polypropylene (PP) as an example. For example, the thickness is substantially the same throughout the storage case 5.

The storage case 5 is generally configured to include, e.g., the main body 50 and the storage portion 52, as shown in FIGS. 3A to 3D and 4A to 4C.

The opening 506 is formed on the lower surface 539 of the storage case 5. The opening 506 has a size spanning from, e.g., the main body 50 to a portion of the storage portion 52, as shown in FIG. 4B.

A storage region 530 is formed inside the storage case 5. The webbing 2, the first tongue 3 and the second tongue 4 are stored in the storage region 530.

The storage case 5 has a box shape. Leg portions 501b and 501c having an outwardly protruding plate shape are formed on a right side surface portion 501 of the main body 50. In addition, leg portions 502b and 502c having an outwardly protruding plate shape are formed on a left side surface portion 502 of the main body 50.

Each of the leg portions 501b and 502b has, e.g., a pawl on an upper surface thereof and the pawl is fitted into an opening of a holder of a below-described lower case 6, thereby integrating the storage case 5 with the lower case 6.

The bracket 7 is attached to an upper surface portion 505 of the main body 50. When the bracket 7 is attached to the main body 50, the insertion hole 504a formed on a rear surface portion 504 of the main body 50 faces the insertion hole 70 of the bracket 7.

The storage portion 52 is formed so as to protrude from a front surface portion 503 of the main body 50. An upper surface portion 520 of the storage portion 52 continues to the upper surface portion 505 of the main body 50.

The storage portion 52 has a plate-like leg portion 501a which protrudes from a right side surface portion 522. In addition, the storage portion 52 has a plate-like leg portion 502a which protrudes from a left side surface portion 525.

The storage portion 52 has, e.g., a shape tapered toward a front end portion 528, as shown in FIGS. 4A to 4C. Furthermore, the storage portion 52 is tapered toward the upper surface portion 520. This tapered portion is composed of a first inclined surface portion 524 and a second inclined surface portion 527.

Meanwhile, side surfaces continuing from the front surface portion 503 of the main body 50, i.e., the right side surface portion 522 and the left side surface portion 525 of the storage portion 52, are each bent toward the front end portion 528. The side surface of the right side surface portion 522 which is bent toward the front end portion 528 is a first side surface portion 523. Meanwhile, the side surface of the left side surface portion 525 which is bent toward the front end portion 528 is a second side surface portion 526.

The upper portions of the right side surface portion 522 and the left side surface portion 525 on the front end portion 528 side and the upper portions of the first side surface portion 523 and the second side surface portion 526 are inclined toward the upper surface portion 520 and an upper surface front end portion 520b.

The inclined portion on the right side surface portion 522 side is the first inclined surface portion 524. Meanwhile, the inclined portion on the left side surface portion 525 side is the second inclined surface portion 527.

A surface on the reverse side of the first inclined surface portion 524 is, e.g., the first inclined surface 534, as shown in FIG. 4C. Meanwhile, a surface on the reverse side of the second inclined surface portion 527 is, e.g., the second inclined surface 535, as shown in FIG. 4C. A tapered shape of the storage portion 52 is formed such that, e.g., normal vectors of the opposing first inclined surface 534 and second inclined surface 535 of the storage portion 52 intersect with each other.

When, for example, the storage portion does not have the first inclined surface 534 and the second inclined surface 535 and has a shape in which only side surfaces are tapered in a horizontal direction, the normal vectors only intersect horizontally, i.e., within a two-dimensional plane and the storage portion 52 cannot carry out vertical positioning.

However, the normal vectors of the first inclined surface 534 and the second inclined surface 535 have not only horizontal components but also vertical components and intersect each other. Therefore, the storage portion 52 allows positioning of the second tongue 4 not only horizontally but also vertically.

The storage portion 52 has a bent portion 520a formed on the opening 506 side of the front end portion 528 by bending a surface which faces the lower surface 539 having the opening 506 formed thereon. The surface facing the lower surface 539 is, e.g., the reverse surface 531 shown in FIG. 4C. The reverse surface 531 corresponds to the reverse side of the upper surface portion 505 of the main body 50 and that of the upper surface portion 520 of the storage portion 52. Meanwhile, a front end portion reverse surface 536 corresponds to the reverse side of the upper surface front end portion 520b which is located on the front end portion 528 side beyond the bent portion 520a of the upper surface portion 520.

A space $W_4$ between the first inclined surface 534 and the second inclined surface 535, at which the front end portion 48 of the tongue plate 44 of the second tongue 4 to be connected to the second buckle 93 is located when stored in the storage portion 52, is smaller than a width $W_2$ of the front end portion 48 of the tongue plate 44, for example, as shown in FIG. 4C.

A space $W_3$ between the first inclined surface 534 and the second inclined surface 535 at the front end portion 528 of the storage portion 52 is larger than a width $W_1$ of a front end portion 38 of the tongue plate 34 of the first tongue 3 which is to be connected to the first buckle 92, for example, as shown in FIG. 4C.

The main body 50 has, at a boundary with the storage portion 52, a right corner portion 532a and a left corner portion 533a which come into contact with front end portions 41 of the grip portion 40 of the second tongue 4 which is a portion to be gripped by a user.

In detail, the right corner portion 532a is formed at a boundary between a right side surface 532 as the reverse side of the right side surface portion 501 and the storage portion 52. The right corner portion 532a is formed at a boundary between the right side surface portion 501 and the front surface portion 503. Meanwhile, the left corner portion 533a is formed at a boundary between a left side surface 533 as the reverse side of the left side surface portion 502 and the storage portion 52. The left corner portion 533a is formed at a boundary between the left side surface portion 502 and the front surface portion 503.

Structure of Lower Case 6

Figure 5A:
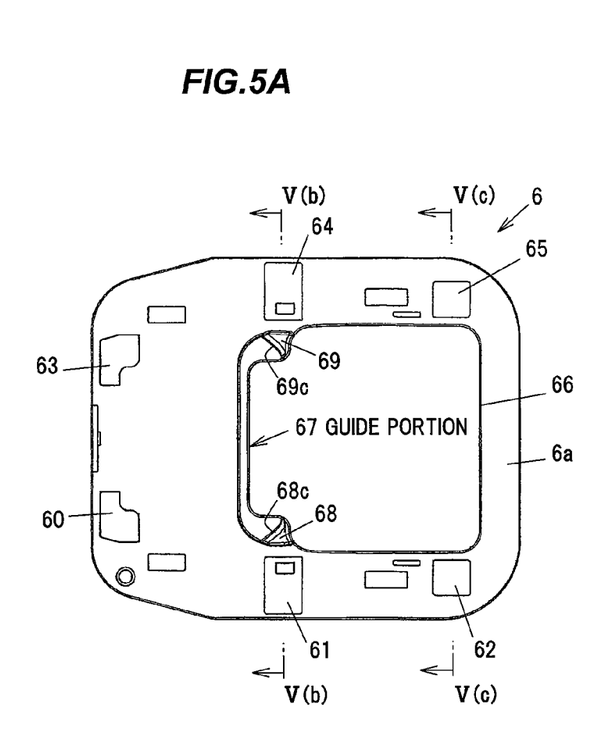
FIG. 5A is a top view showing the lower case in the embodiment.
Figures 5B, 5C:
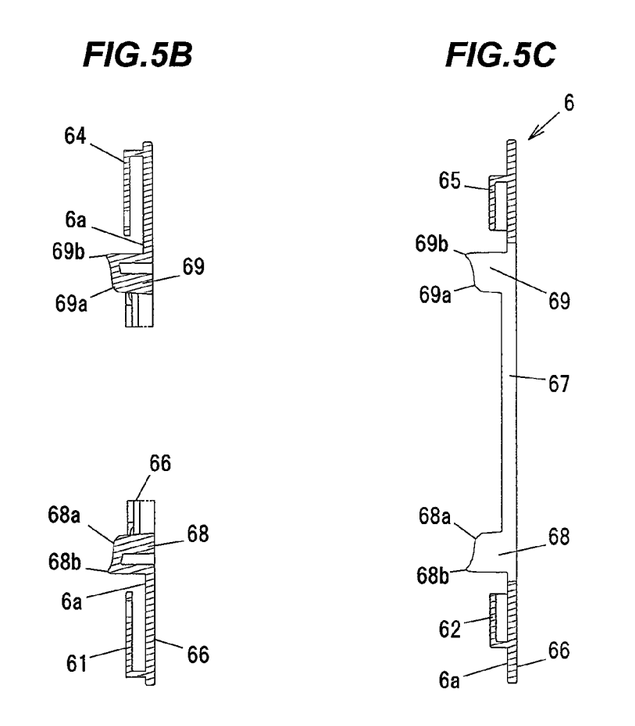
FIG. 5B is a cross sectional view taken on line V(b)-V(b) shown in FIG. 5A as viewed in an arrow direction and FIG. 5C is a cross sectional view taken on line V(c)-V(c) shown in FIG. 5A as viewed in an arrow direction.

FIG. 5A is a top view showing the lower case in the embodiment, FIG. 5B is a cross sectional view taken on line V(b)-V(b) shown in FIG. 5A as viewed in an arrow direction and FIG. 5C is a cross sectional view taken on line V(c)-V(c) shown in FIG. 5A as viewed in an arrow direction.

The lower case 6 has, e.g., a plate shape as shown in FIGS. 5A to 5C. The lower case 6 is formed by, e.g., injection molding using a synthetic resin material of polypropylene base, polystyrene base, polyethylene base, polyamide base or acrylonitrile butadiene styrene (ABS), etc. The lower case 6 is formed of polypropylene (PP) as an example.

The lower case 6 is attached to the opening 506 of the storage case 5, and has the insertion hole 504a through which the first tongue 3 and the second tongue 4 are inserted and a guide portion 67 which guides insertion of the second tongue 4.

The insertion opening 66 is formed so that a rear side of the opening 506 of the storage case 5, i.e., the insertion hole 504a is exposed.

In addition, holders 60 to 65 into which the leg portions of the storage case 5 are inserted are formed on the front surface 6a of the lower case 6, for example as shown in FIG. 5A. The holders 60 to 65 have, e.g., a shape vertically rising from the front surface 6a and then protruding in a direction parallel to the front surface 6a, thereby having a structure in which the leg portion is sandwiched and held between the front surface 6a and the protruding portion.

The leg portion 501a is inserted into the holder 60. The leg portion 501b is inserted into the holder 61. The leg portion 501c is inserted into the holder 62. The leg portion 502a is inserted into the holder 63. The leg portion 502b is inserted into the holder 64. The leg portion 502c is inserted into the holder 65. The lower case 6 is attached to the storage case 5 by these insertions.

The guide portion 67 is generally configured to include, e.g., a right guide portion 68 and a left guide portion 69, as shown in FIG. 5A.

The right guide portion 68 guides the right side of the grip portion 40 of the inserted second tongue 4. Meanwhile, the left guide portion 69 guides the left side of the grip portion 40 of the second tongue 4.

The right guide portion 68 is formed so as to protrude from the front surface 6a, for example as shown in FIGS. 5B and 5C. In addition, the right guide portion 68 is generally configured to include an upper surface portion 68a and a top portion 68b as a peak of the upper surface portion 68a such that the upper surface portion 68a has a shape curved toward the top portion 68b.

The left guide portion 69 is formed so as to protrude from the front surface 6a, for example as shown in FIGS. 5B and 5C. In addition, the left guide portion 69 is generally configured to include an upper surface portion 69a and a top portion 69b as a peak of the upper surface portion 69a such that the upper surface portion 69a has a shape curved toward the top portion 69b.

The right guide portion 68 and the left guide portion 69 are arranged according to the shape of the end portion of the grip portion 40 of the second tongue 4, for example as shown in FIG. 5A. Shapes of a contact portion 68c of the right guide portion 68 and a contact portion 69c of the left guide portion 69 correspond to the shape of the rear portion 43 of the grip portion 40 of the second tongue 4. Accordingly, the grip portion 40 of the second tongue 4 stored in the storage portion 52 comes into contact with the contact portion 68c and the contact portion 69c.

Structures of Bracket 7 and Retractor 8

The bracket 7 is formed by, e.g., pressing a steel plate. The retractor 8 is attached to the bracket 7.

The retractor 8 is a take-up device which allows the stored webbing 2 to be pulled out and which can wind the webbing 2. The retractor 8 generates a force in a direction of winding the webbing 2. Accordingly, a force in a winding direction is applied to the webbing 2 which is pulled out.

Holding First Tongue 3 and Second Tongue 4

Figure 6A:
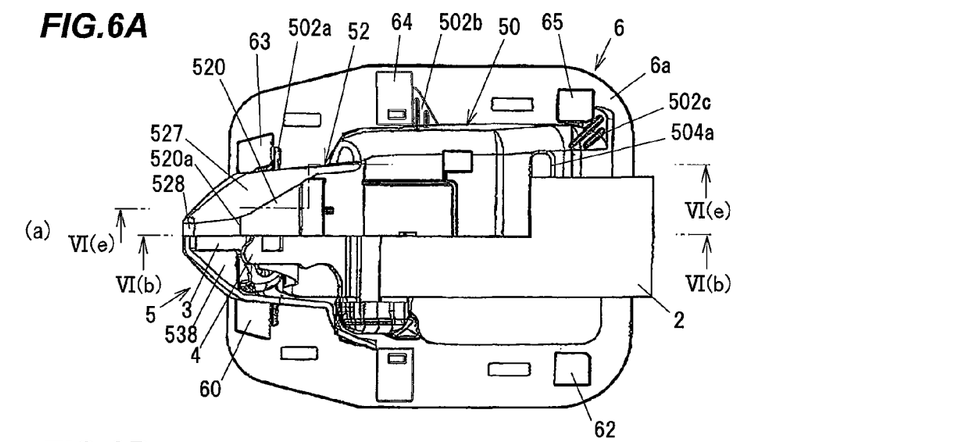
FIG. 6A is a partial cross sectional view showing the storage case with the lower case attached thereto in the embodiment.
Figure 6B:
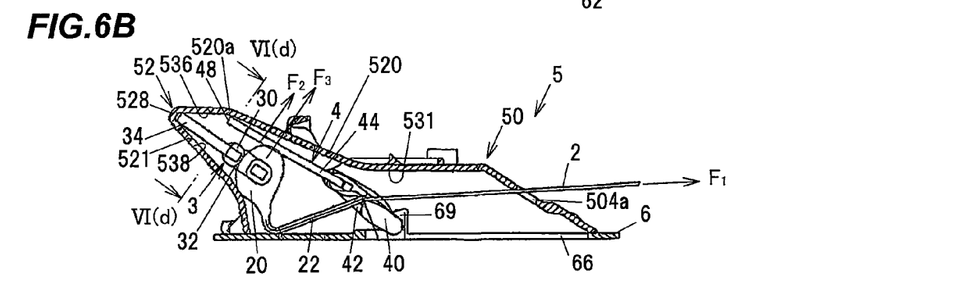
FIG. 6B is a cross sectional view taken on line VI(b)-VI(b) shown in FIG. 6A as viewed in an arrow direction.
Figure 6C:
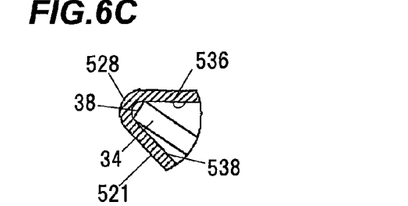
FIG. 6C is an enlarged cross sectional view showing a front end portion of the storage case.
Figure 6D:
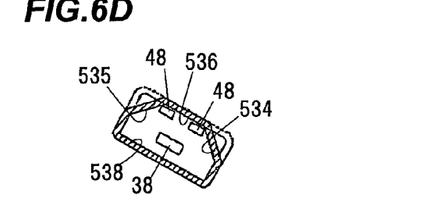
FIG. 6D is a cross sectional view taken on line VI(d)-VI(d) shown in FIG. 6B as viewed in an arrow direction and FIG. 6E is a cross sectional view taken on line VI(e)-VI(e) shown in FIG. 6A as viewed in an arrow direction.
Figure 6E:
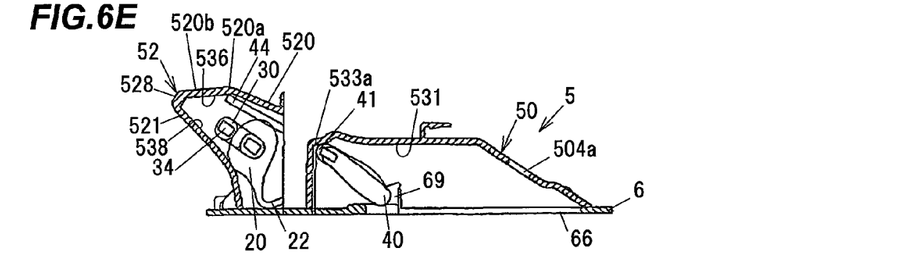

FIG. 6A is a partial cross sectional view showing the storage case with the lower case attached thereto in the embodiment, FIG. 6B is a cross sectional view taken on line VI(b)-VI(b) shown in FIG. 6A as viewed in an arrow direction, FIG. 6C is an enlarged cross sectional view showing a front end portion of the storage case, FIG. 6D is a cross sectional view taken on line VI(d)-VI(d) shown in FIG. 6B as viewed in an arrow direction and FIG. 6E is a cross sectional view taken on line VI(e)-VI(e) shown in FIG. 6A as viewed in an arrow direction.

In the state that the first tongue 3 and the second tongue 4 are stored in the storage portion 52, the second tongue 4 is located on the first tongue 3, as shown in FIGS. 6A and 6B. In this state, the front end portion 38 of the tongue plate 34 of the first tongue 3 is pressed against and comes into contact with the front end portion reverse surface 536 as a reverse surface of the upper surface portion 520 in the vicinity of the front end portion 528 and a lower surface portion reverse surface 538 as a reverse surface of a lower surface portion 521 as shown in FIGS. 6B and 6C since the storage portion 52 has a tapered shape. The front end portion 38 is pressed since the webbing 2 at a folded-back portion 20 applies a force to the insertion hole 32 on the tongue plate 34 side.

The tongue plate 44 of the second tongue 4 stored in the storage portion 52 is held by the folded-back portion 20 as a portion inserted through and folded back at the insertion hole 32 of the first tongue 3 and also by the first inclined surface 534 and the second inclined surface 535.

Here is the detail. The webbing 2 is less likely to deform in a longitudinal direction. And also, the stitching 22 is hard to deform at a position in which a distance from the tongue plate 44 of the stored second tongue 4 to the lower surface portion reverse surface 538 of the storage portion 52 is smaller than the thickness of the folded-back portion 20. As a result, mainly the folded-back portion 20 deforms. The folded-back portion 20 is more likely to deform on the insertion hole 32 side than the stitching 22 side and thus pushes the grip portion 30 toward the front end portion 528 of the storage portion 52. Therefore, the front end portion 38 of the tongue plate 34 of the first tongue 3 is pressed against and comes into contact with the front end portion reverse surface 536 and the lower surface portion reverse surface 538.

On the other hand, the grip portion 40 is pressed against the guide portion 67 since a winding force $F_1$ as a force of winding the webbing 2 by the retractor 8 is applied to the webbing 2 and the stitching 22 does not pass through the insertion hole 42 of the grip portion 40, and accordingly, the second tongue 4 receives a rotational force $F_2$ about the rear portion 43 of the grip portion 40.

In addition, since the tongue plate 44 of the second tongue 4 is located on the folded-back portion 20 of the previously inserted first tongue 3, an elastic force $F_3$ from the folded-back portion 20 is applied to the tongue plate 44. Therefore, as shown in FIG. 6D, the front end portion 48 of the tongue plate 44 comes into contact with the first inclined surface 534 and the second inclined surface 535. This occurs because the width $W_2$ of the front end portion 48 of the tongue plate 44 is larger than the space $W_4$ at the bent portion 520a of the storage portion 52.

Furthermore, the front end portions 41 of the grip portion 40 of the second tongue 4 are pressed against upper portions of the right corner portion 532a and the left corner portion 533a by the rotational force $F_2$ and the elastic force $F_3$, as shown in FIG. 6E.

Therefore, the second tongue 4 is held in the storage case 5 by the contact of the front end portion 48 with the first inclined surface 534 and the second inclined surface 535 and the contact of the grip portion 40 with the contact portion 68c of the right guide portion 68 and the contact portion 69c of the left guide portion 69.

Subsequently, insertion of the first tongue 3 and the second tongue 4 will be described below in reference to each drawing.

Insertion of First Tongue 3 and Second Tongue 4

Figure 7A:
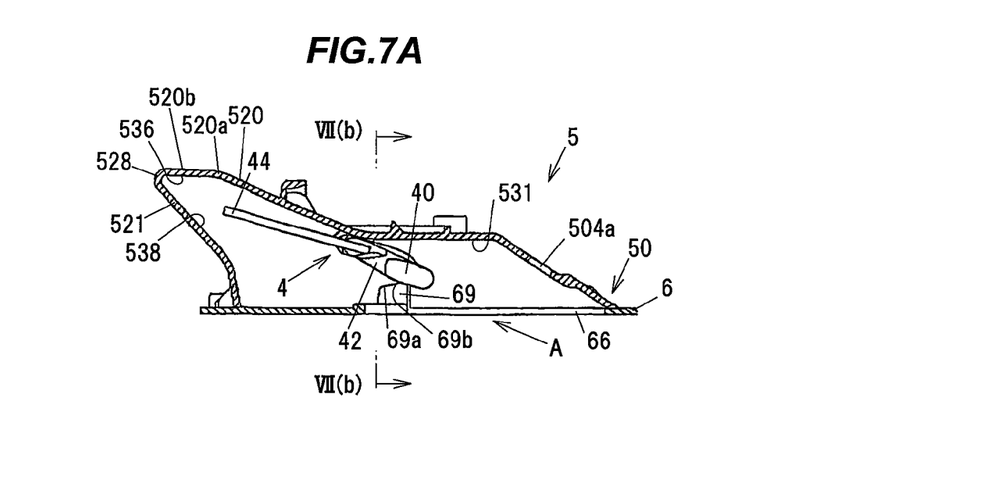
FIG. 7A is a cross sectional view showing the seat belt system in the embodiment taken on line VI(b)-VI(b) shown in FIG. 6A as viewed in an arrow direction.
Figure 7B:
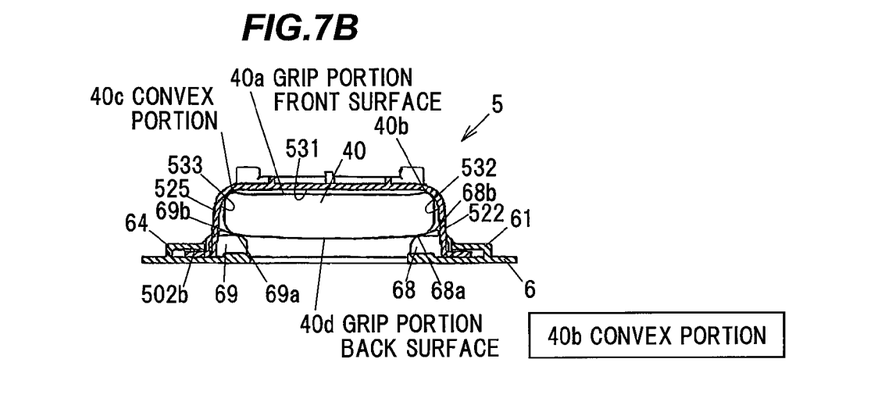
FIG. 7B is a cross sectional view taken on line VII(b)-VII(b) shown in FIG. 7A as viewed in an arrow direction and FIG. 7C is a partial enlarged view of FIG. 7B.
Figure 7C:
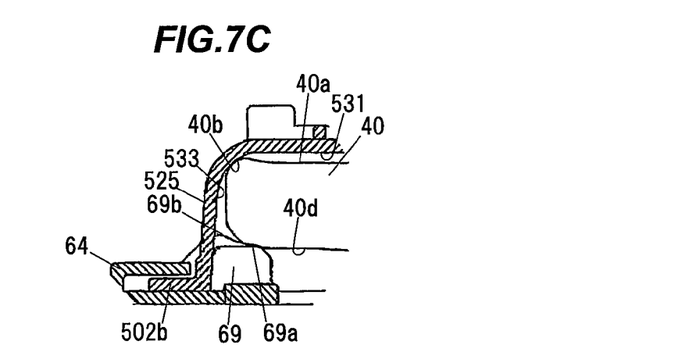

FIG. 7A is a cross sectional view showing the seat belt system in the embodiment taken on line VI(b)-VI(b) shown in FIG. 6A as viewed in an arrow direction, FIG. 7B is a cross sectional view taken on line VII(b)-VII(b) shown in FIG. 7A as viewed in an arrow direction and FIG. 7C is a partial enlarged view of FIG. 7B. FIG. 7A is a cross sectional view showing a state that the second tongue 4 is being inserted and an illustration of the first tongue 3 is omitted here in order to explain the insertion of the second tongue 4.

As shown in FIGS. 3B and 3C, the first tongue 3 and the second tongue 4 are inserted in the arrow-A direction from the insertion opening 66 on a back surface 6b side of the lower case 6 toward the storage portion 52.

Firstly, the first tongue 3 is inserted into a space between the lower surface portion reverse surface 538 of the storage portion 52 and the guide portion 67 and the second tongue 4 is subsequently inserted. Note that, the webbing 2 is wound by the retractor 8 and the stitching 22 is in contact with the insertion hole 42 of the second tongue 4.

When the second tongue 4 is inserted into the insertion opening 66 from the front end portion 48 of the tongue plate 44, for example, a convex portion 40b of the front end portion 41 of the grip portion 40 is guided by a periphery of the boundary between the right side surface 532 and the reverse surface 531 of the main body 50 and a convex portion 40c is guided by a periphery of the boundary between the left side surface 533 and the reverse surface 531, as shown in FIGS. 7A to 7C. In addition, a grip portion back surface 40d of the grip portion 40 is guided by the upper surface portion 68a of the right guide portion 68 and the upper surface portion 69a of the left guide portion 69. The convex portions 40b and 40c are formed by, e.g., indenting around the middle of a grip portion front surface 40a so as to be easily gripped by a user.

When, for example, the insertion direction of the second tongue 4 is offset to the left from the arrow-A direction, the right front end portion 41 of the grip portion 40 firstly comes into contact with the right corner portion 532a of the main body 50 and the movement is restricted. Therefore, the second tongue 4 rotates so as to be inserted from the arrow-A direction and the insertion direction thereof is corrected. Then, the convex portion 40b is guided by the periphery of the boundary between the right side surface 532 and the reverse surface 531, the convex portion 40c is guided by the periphery of the boundary between the left side surface 533 and the reverse surface 531, and the second tongue 4 is thereby inserted in the correct insertion direction.

When the second tongue 4 is moved to the lower case 6 side so that the rear portion 43 of the grip portion 40 is in contact with the contact portion 68c of the right guide portion 68 and the contact portion 69c of the left guide portion 69, the front end portion 48 of the tongue plate 44 is guided by the first inclined surface 534 and the second inclined surface 535. Following this, the tongue plate 44 is pressed against the reverse surface 531 by the rotational force $F_2$ and the elastic force $F_3$, as shown in FIG. 6D. Accordingly, the grip portion 40 is held by the right corner portion 532a, the left corner portion 533a and the guide portion 67 and, at the same time, the front end portion 48 is pressed against the first inclined surface 534 and the second inclined surface 535, thereby holding the second tongue 4.

Due to the insertion of the second tongue 4, the grip portion 30 of the first tongue 3 is pressed toward the front end portion 528 of the storage portion 52 in accordance with the movement of the stitching 22 in the insertion direction. As the second tongue 4 is held by the guide portion 67, the front end portion 38 of the tongue plate 34 of the first tongue 3 comes into contact with the front end portion reverse surface 536 and the lower surface portion reverse surface 538, as shown in FIG. 6C.

EFFECTS OF THE EMBODIMENT

In the seat belt system 1 in the embodiment, positional offset when stored and noise generation due to vibration transmission from the vehicle 9 can be suppressed. In detail, the storage portion 52 of the storage case 5 of the seat belt system 1 has a shape in which the first side surface portion 523 and the second side surface portion 526 are tapered toward the front end portion 528 and also the upper surface front end portion 520b and the lower surface portion 521 are tapered, and furthermore, the first inclined surface 534 and the second inclined surface 535 are formed. In the seat belt system 1, the shape of the storage portion 52 allows the insertion of the first tongue 3 and the second tongue 4 to be guided, a difference in a pressing amount in a horizontal direction to be reduced, and furthermore, a vertical position to be determined. Therefore, in the seat belt system 1, it is possible to suppress oblique storage which is a stored state different from the intended storage state and it is also possible to suppress noise generation caused by backlash due to the oblique storage as compared to the case where the inclined surfaces are not formed on the side surfaces.

In the seat belt system 1, since the storage portion 52 has a shape which is vertically tapered from the bent portion 520a toward the front end portion 528, it is possible to guide the insertion by contact with the front end portion 38 of the first tongue 3 and to suppress the vertical backlash. In addition, horizontal backlash of the tongue plate 34 of the first tongue 3 is suppressed by the first inclined surface 534 and the second inclined surface 535.

In the seat belt system 1, it is possible to suppress the horizontal backlash since the space $W_4$ between the first inclined surface 534 and the second inclined surface 535 at the bent portion 520a is smaller than the width $W_2$ of the front end portion 48 of the second tongue 4 and the front end portion 48 of the second tongue 4 thereby comes into contact with the first inclined surface 534 and the second inclined surface 535 in the vicinity of the bent portion 520a. In addition, in the seat belt system 1, since the bent portion 520a at which an angle of the reverse surface 531 is changed is provided at a position corresponding to the front end portion 48 of the second tongue 4, the second tongue 4 is easily guided to a position to be stored.

In the seat belt system 1, it is possible to suppress the oblique storage since the right guide portion 68 and the left guide portion 69 formed on the lower case 6 guide the insertion of the second tongue 4 and hold the end portion of the grip portion 40 from the right and left sides.

In the seat belt system 1, it is possible to correct the insertion direction of the obliquely stored second tongue 4 and thereby to suppress the oblique storage since the right corner portion 532a and the left corner portion 533a which restrict the movement of the grip portion 40 of the second tongue 4 is provided at a boundary between the main body 50 and the storage portion 52.

Since the webbing 2 of the seat belt system 1 is provided with the stitching 22 which has a thickness larger than the width of the insertion hole 42 of the second tongue 4, the seat belt system 1 can use the winding force $F_1$ of the retractor 8 to hold the second tongue 4. Therefore, the seat belt system 1 can stably hold the second tongue 4.

Although some embodiments of the invention have been described, the embodiments are merely an example and the invention according to claims is not to be limited thereto. These new embodiments may be implemented in various other forms, and various omissions, substitutions and changes, etc., can be made without departing from the gist of the invention. In addition, all combinations of the features described in the embodiments are not necessary to solve the problem of the invention. Further, these embodiments are included within the scope and gist of the invention and also within the invention described in the claims and the range of equivalency.

What is claimed is:

1. A seat belt system, comprising:
a storage case comprising a main body having a box shape and a storage portion, the main body having an opening formed thereon through which first and second tongues are inserted, the first tongue being attached to an end of a belt and to be connected to a first buckle on a seat side, the second tongue being movably attached to the belt and to be connected to a second buckle on the seat side, and a storage portion formed in a shape tapered in an insertion direction of the first and second tongues, protruding from the main body and comprising first and second inclined surfaces that are formed on both sides of a surface opposite a surface having the opening formed thereon and are inclined to guide insertion of the first and second tongues,
wherein a tongue plate of the second tongue stored in the storage portion is held by a portion of the belt inserted through and folded back at a first belt insertion hole of the first tongue and by the first and second inclined surfaces.

2. The seat belt system according to claim 1, wherein a space between the first and second inclined surfaces at a front end portion of a tongue plate of the second tongue when stored in the storage portion is smaller than a width of the front end portion of the tongue plate.

3. The seat belt system according to claim 1, wherein the storage portion comprises a corner portion to contact with a front end portion of the tongue plate of the second tongue, and wherein the tongue plate of the second tongue when stored in the storage portion is held at the corner portion by being pressed against the first and second inclined surfaces by an elastic force of the portion of the belt.

4. The seat belt system according to claim 1, wherein the storage portion comprises, on an inside thereof, a first corner portion to contact with a front end portion of a tongue plate of the first tongue and a second corner portion to contact with a front end portion of the tongue plate of the second tongue.

5. The seat belt system according to claim 4, wherein the first and second corner portions are each formed between the first and second inclined surfaces.

6. The seat belt system according to claim 4, wherein the first corner portion has a longer distance from the opening than the second corner portion.

7. A seat belt system, comprising:
a storage case comprising a main body having a box shape and a storage portion, the main body having an opening formed thereon through which first and second tongues are inserted, the first tongue being attached to an end of a belt and to be connected to a first buckle on a seat side, the second tongue being movably attached to the belt and to be connected to a second buckle on the seat side, and a storage portion formed in a shape tapered in an insertion direction of the first and second tongues, protruding from the main body and comprising first and second inclined surfaces that are formed on both sides of a surface opposite a surface having the opening formed thereon and are inclined to guide insertion of the first and second tongues,
wherein the storage portion comprises, on an inside thereof, a first corner portion to contact with a front end portion of a tongue plate of the first tongue and a second corner portion to contact with a front end portion of a tongue plate of the second tongue.

8. The seat belt system according to claim 7, wherein the first and second corner portions are each formed between the first and second inclined surfaces.

9. The seat belt system according to claim 7, wherein the first corner portion has a longer distance from the opening than the second corner portion.

* * * * *